United States Patent [19]
Nelson et al.

[11] 3,987,523
[45] Oct. 26, 1976

[54] APPARATUS AND METHOD FOR FORMING END SURFACES ON ANNULAR WORK PIECES

[76] Inventors: Jerome W. Nelson, 11410 Holidan Way, Houston, Tex. 77024; Earl B. Nay, 2210 Dearborn St., Houston, Tex. 77055; Eric W. Wittmann, 10223 Shadow Wood Drive, Houston, Tex. 77043; Robert E. Pollock, deceased, late of Katy, Tex.; by Peggy Pollock, executrix, 9528 Arthur St., Crow Point, Ind. 46307

[22] Filed: Aug. 11, 1975

[21] Appl. No.: 603,363

Related U.S. Application Data

[63] Continuation-in-part of Ser. No. 373,483, June 25, 1973, Pat. No. 3,922,517.

[52] U.S. Cl. .............................. 29/33 T; 29/200 P; 82/1 C
[51] Int. Cl.² ................... B23P 23/04; B23P 19/00; B23B 3/00
[58] Field of Search ............ 29/200 P, 33 T; 82/1 C, 82/4 C, 4.3; 144/205

[56] References Cited
UNITED STATES PATENTS

| | | |
|---|---|---|
| 2,102,259 | 12/1937 | Edwards et al. .................. 29/33 T |
| 3,103,140 | 9/1963 | Connelley ......................... 29/33 T |
| 3,461,264 | 8/1969 | Nelson et al. ..................... 29/200 P |
| 3,608,406 | 9/1971 | Paysinger et al. ................. 82/1 C |
| 3,733,939 | 5/1973 | Paysinger et al. ................. 82/4 C |

*Primary Examiner*—Harrison L. Hinson

[57] ABSTRACT

An annular work piece, such as a large pipe, is prepared for welding end-to-end to a similar piece, by a combination of cutting or machining and swaging or cold-rolling, to form bevel, land, and an annular fin-like projection which will better control penetration. In its apparatus aspects, an internal clamp mechanism is used to hold the pipe against rotation while also keeping it essentially circular in outline, a series of cutting tools, preferably complementing each other, is driven around the pipe and end for exterior and interior bevel surfaces with a more or less plane land surface between them. Rollers which serve to constrain and guide the cutting tools are thereafter employed to swage or cold-work the interior of the pipe end to form a small sharp-edged annular projection which serves as a heat sink to control and limit penetration of molten metal from an external electric arc into the interior of the joint. A supplementary back-up or chill may be used for further control, if needed.

5 Claims, 5 Drawing Figures

U.S. Patent  Oct. 26, 1976  3,987,523 ns on Annular Work Pieces

APPARATUS AND METHOD FOR FORMING END SURFACES ON ANNULAR WORK PIECES

This application is a continuation-in-part of Ser. No. 373,483, filed in the United States on June 25, 1973, and in Great Britain Dec. 12, 1972, now Patent No. 3,922,517 issued Nov. 25, 1975.

BACKGROUND AND PRIOR ART

The joining of annular work pieces together in end-to-end relationship, as in building pipe lines, is a highly technical procedure. Many have attempted to do this by automatic methods, or semi-automatic. Some have been successful but most have not. The rigid specifications required for girth joints in pipelines, as used for transmission of natural gas and petroleum products have made it difficult to accomplish by machinery. Hand welding or semi-automatic procedures have not been entirely satisfactory either and they are expensive.

While a recently developed system, as in U.S. Pat. No. 3,461,264, which starts with an internal "stringer bead" and completes the joint from the outside has been quite successful commercially, it would be preferable, if possible to weld the whole joint from the outside. Major difficulties encountered in attempts to weld from the outside often involve the control of penetration. Many proposals have been made to control penetration by use of back-up or internal chill members. These add to the complexity of apparatus and method and are not always useful because of misalignment of elements of pipe ends that are to be joined together.

The precise and careful preparation of the end surfaces to be joined is one important requirement for successful welding of girth joints in the field. In a shop, where heavy, massive equipment can be employed, quality joints can more readily be welded and preparatory end-shaping operations can more readily be carried out.

Notable advances in the field preparations of pipe ends for welding were realized when portable precision equipment such as in U.S. Pat. Nos. 3,608,406 and 3,733,933 was developed. The present invention involves further refinements to obtain better control of the flow of molten metal from the electric arc, especially when the initial welding pass is to be made from the outside of the pipe. A combination of machining and of cold rolling or swaging of the metal is found to be highly useful.

DESCRIPTION OF PREFERRED EMBODIMENT

Figure 1:
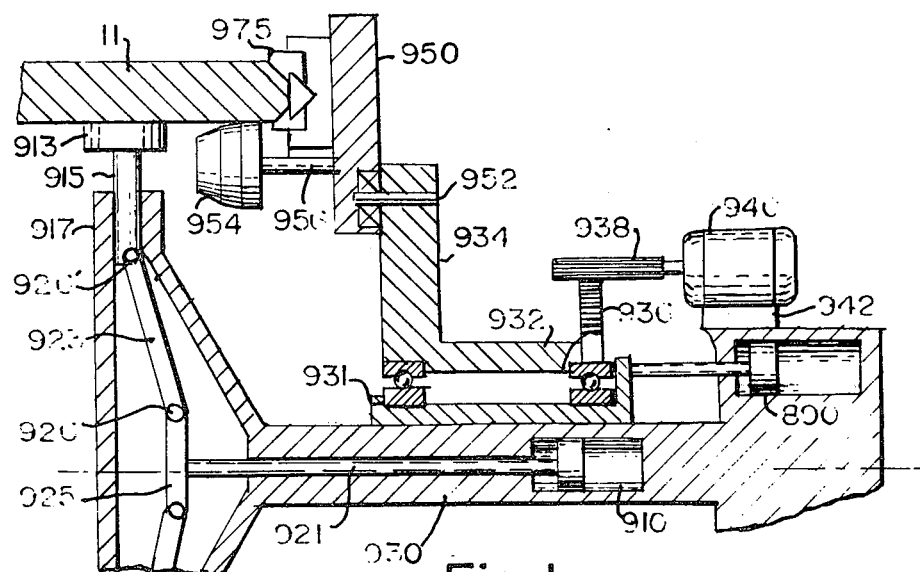
FIG. 1 is a vertical sectional view of apparatus of the present invention.
Figure 2:
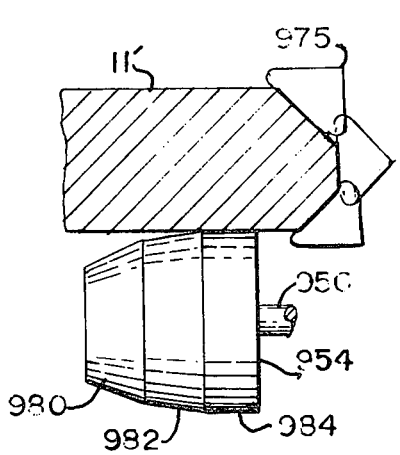
FIGS. 2 and 3 are detailed views, partly in section, showing a combination of machining and swaging or cold rolling apparatus and procedures.
Figure 3:
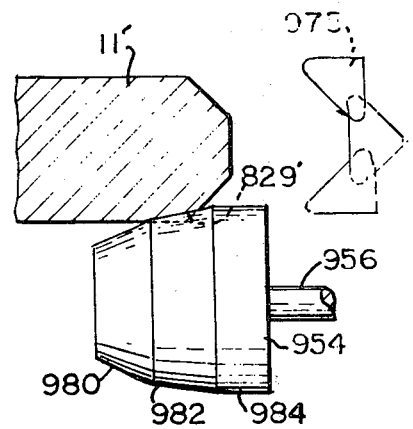
Figure 4:
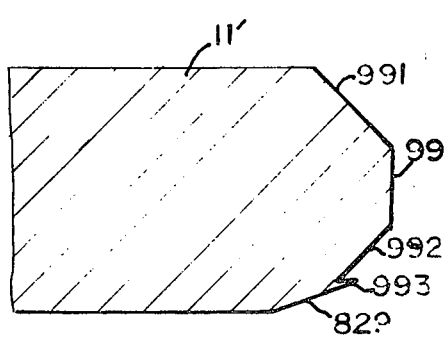
FIGS. 4 and 5 are detail sectional views of a pipe end and a joint made according to the present invention.

Referring now to FIGS. 1, 2 and 3, there is shown a preferred means for forming the shallow or mildly tapered inside bevel 829 of FIG. 4. The structure and operation of the device of FIG. 1, except for the specifically shaped surfaces of roller 954 and its use in the present case to form the specially shaped inner bevel are fully described and illustrated in U.S. Pat. Nos. 3,608,406 and 3,733,939, issued Sept. 28, 1971, and May 22, 1973, respectively, to Joseph R. Paysinger, et al., to which reference is here made.

A pipe clamping machine is shown in part, as comprising a set or preferably two sets, as in U.S. Pat. No. 3,733,939, of pipe wall engaging clamping shoes 931, FIG. 1. These are arranged in a clamp frame to extend all around the axis of the pipe 11 so as to grip its interior surface when moved radially outward. Only part of the clamp is shown in FIG. 1. Each shoe 913 is supported on a radially-extensible rod 915 which is guided through ring members 917. The rod 915 may be moved out to clamping position or drawn into release position by any suitable means, e.g., cams, toggles, etc. For example, a toggle means, including a longitudinally movable central shaft 921, is shown which operates to move toggle rods or bars 923. These bars are connected at 926 to a central hub 925 fixed to shaft 921. Each toggle rod 923 is pivotally connected at its outer end 926' to radially slidable clamp rod 915, each of which carries a clamp shoe 913. When shaft 921 is moved to the left, the clamp shoes are tightened. When the shaft 921 is retracted toward the right, the clamp shoes are released from clamping position. Rod 921 may be operated by any suitable means, such as by piston and cylinder arrangement 910, as described more fully in the patents mentioned above.

The principal support element for the end-forming mechanism comprises a main and non-rotatable hollow shaft 930. On this shaft is slidably mounted a non-rotating sleeve 931. The latter supports for rotation on bearings 933 a rotatable cylinder 932. Cylinder 932 is attached to a face plate 934. A gear 936 is also secured to or formed integrally with the cylinder 932 which gear is designed to be driven in rotation around the sleeve 931 and the shaft 930 by an elongated spur gear 938 fixed to the output shaft of an electric motor 940. This motor is supported by a fixed element 942 on the main clamp frame.

The cylinder 932 rotates on the sleeve 931 while the sleeve 931 is secured against rotation with respect to the shaft 930, it being understood that the sleeve 931 and the cylinder 932 which it supports can slide axially along the shaft 930. Mounted on the left side of face plate 934 as seen in FIG. 1, are a plurality, preferably three, of arms 950 each pivotally supported on a pin 952 secured to the face plate. These movable or pivotally-mounted arms each can rock about pivot pins 952 mounted in the face plate 934 which constitute their support. Each arm 950 carries cutters 975 and a cutter guiding and forming roller 954. The cutters preferably are in a series, so as to accomplish their cutting function in progressive steps. That is, the first engages the pipe end and makes a partial cut, the next carries it a step further and the third a step still further. Thus, the cutters complement each other. Each arm carries also a roller 954. Roller 954 is shown in more detail in FIGS. 2 and 3.

These rollers 954 are firmly mounted but freely rotatable on their shafts 956 and they are adapted to move inside and roll around the inner surface on the work piece such as pipe 11, FIG. 1, or 11' in the other Figures, the end surface of which is to be machined and shaped to the desired final shape or profile.

Each arm 950 is strongly loaded by heavy spring means or otherwise in such a way that the rollers 954 are firmly urged radially outward away from the central hollow shaft 930. A main purpose of these arms 950 is to carry the cutting elements and a further purpose is to carry and drive the cold-working, or swaging forming rollers 954 to create the particular shape desired on the pipe end. The special purpose of rollers 954 is to assure not only that the surface will be accurately machined or shaped by cutters 975 all around the annular pipe end in a predetermined relationship to the inner periphery of the pipe, as in the patents mentioned above, but, additionally, according to the present invention, to accomplish further shaping, preferably on partial withdrawal from the pipe, to form the inner shallow or mildly tapered inner bevel 829 best illustrated in FIGS. 2 and 3, and especially FIG. 4. The rollers 954 are specially shaped for this purpose, as explained below.

During the first part of the operation, as rollers 954 move around inside of the pipe, the machine or cutting elements 975 cut the desired contour on the end of the pipe, as mentioned above and illustrated in FIG. 2. When the desired end contour has been cut, except for the shallow inner bevel 829 and annular edge 993, FIG. 4, the cutters and the arms 950 supporting them are partially withdrawn from operating position by a pair of hydraulic cylinders 890, only one of which is shown. Cutters 975 are fully disengaged. Main bevel cuts 991, 992 as well as the plane land cut 990 are shown in FIG. 4. In addition to these cuts a small annular fin, appearing in cross section as a small spur element 993, is formed by the cold rolling effect on the inner pipe end caused by the mildly beveled surface 982 of roller 954.

Each roller has three beveled surfaces, 980, 982, and 984. Each roller is of hardened steel, its surface 982, in particular, is very hard. The outer bevel surface 980, which is rather steeply beveled, is used to guide the roller 954 into position within the end of pipe 11. The intermediate bevel portion 982, is the mildly tapered portion of the roller 954 used to form the shallow inner bevel 829 by cold rolling action upon partial withdrawal of the rollers 954. Surface 984 is even more mildly tapered and approaches a cylindrical shape; these surfaces should be compared with the profile of the rollers in U.S. Pat. Nos. 3,608,406 and 3,733,939, mentioned above.

To summarize, as the apparatus is to be used for shaping a pipe end for welding, the clamping structure is placed within the pipe 11 which is to have its end surface suitably shaped. After the clamp has been inserted a suitable distance, the clamp shoes 913 are operated to expand them into tight clamping position, firmly holding the pipe round and against rotation. Thereafter, the hydraulic pistons 890 are operated to move the sleeve 931 and the cylinder 932 to the left. This forces the rollers 954 to move inside the pipe 11, causing arms 950 to move radially inward by the action of the end of the pipe 11 upon the inclined bevel surfaces 980 and 982 of rollers 954. The cylinder or sleeve 932, FIG. 13, is then driven in rotation by motor 940 to machine cut the end surfaces to desired profile, the cutter elements 975, of course, being shaped, preground, and arranged in proper sequence to follow each other as they cut the desired profile in the pipe ends.

After the desired cut profile, FIG. 2, is made, the pistons 890 are actuated to retract rollers 954 axially along the pipe from the position shown in FIG. 2 to the position shown in FIG. 3; the bevel surface 982 on each of them will bear against the internal end of pipe 11. Because of their heavy loading, by springs for example, they form the shallow bevel 829 as face plate 934 drives them around the pipe interior. Thereafter, the piston 890 is actuated further to withdraw the whole cutting element and roller assembly from the end of pipe 11. The spring loading required for cold rolling the bevel surface 829 may be considered heavier, if required, than that described in the aforesaid patents. Positive loading in lieu of or in addition to springs shown in the patents, may be added if required.

Figure 5:
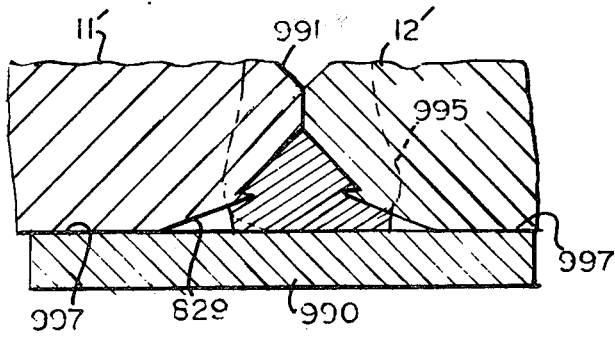

As shown in FIG. 5, when an inner bead weld is produced from the outside of a pipe joint, the adjoining pipe ends having been beveled at 991 and 992, with the cold roller taper 829 as described above, a minor annular fin or projecting edges 993 is produced on each of the pipe ends to be joined. These thin annular elements serve to hold the meniscus of molten metal as deposited from the electric arc and thus to control the contour of the bead inside the pipe. These fins or edges 993 serve in other words as minor heat sinks to further control metal flow into the inner V-gap, which comprises surfaces 829 and 992, FIG. 4. The welded area 995 thus is solidified in the desired form. In FIG. 5 a flush back-up member 990, which bears at its edges 997 against the inner pipe walls is shown. In some cases it is not necessary. In case the molten metal comes through farther than necessary, its protrusion will be limited as it congeals against the chill or back-up 990. The latter, of course, is adapted to be contracted and taken out of the joint after welding is complete, as is well known in the art.

It will be obvious that certain changes may be made in apparatus and method by those skilled in the art, without departing from the spirit and purpose of the invention. It is intended by the claims that follow to cover these as broadly as the state of the art properly permits.

What is claimed is:

1. Apparatus for forming a profiled surface on an end of an annular object, such as a pipe, including in combination, means for firmly gripping said object and holding it against rotation, cutting means for forming (1) an outer bevel, (2) an intermediate plane land, and (3) an inner bevel in said end, power-driven rotatable means for carrying and operating said cutting means around said end, roller means also carried by said rotatable means and associated with said cutting means for maintaining positional control over said cutting means with respect to said end, a mildly tapered surface on said roller means for cold-rolling a low taper inside said end adjacent said inner bevel, and means for forcibly holding said roller means radially outward against the inside surface of said object while said cold rolling is accomplished.

2. Apparatus according to claim 1 in which the roller means includes a substantially cylindrical surface adjoining the mildly tapered surface on one side and a more steeply tapered surface adjoining the mildly tapered surface on the other side.

3. Apparatus according to claim 1 in which the means for forcibly holding the roller radially outward is formed to apply sufficient force to roll a thin projecting edge in the radially inner part of said end of said annular object.

4. A method of forming a thin annular edge in the inner part of an annular end of a hollow cylindrical work piece such as a pipe, which comprises holding said pipe firmly against rotation and against deformation from a substantially circular shape, cutting and end profile on said annular end with an outer bevel, an intermediate land and an inner bevel, and forcibly cold rolling the interior cylindrical surface of the work piece to swage the metal outwardly and axially towards said end, thereby forming a sharp tapered annular edge which serves as a heat sink.

5. Method according to claim 4 in which the cutting is accomplished in a series of complementary operations by moving complementary cutters around the work.

* * * * *